Sept. 10, 1963     D. W. SCOFIELD     3,103,162
ELECTRIC APPLIANCE
Filed Dec. 20, 1960
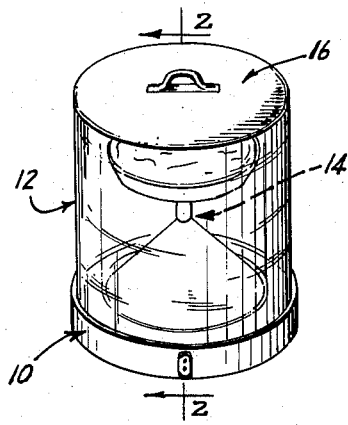
FIG. 1.
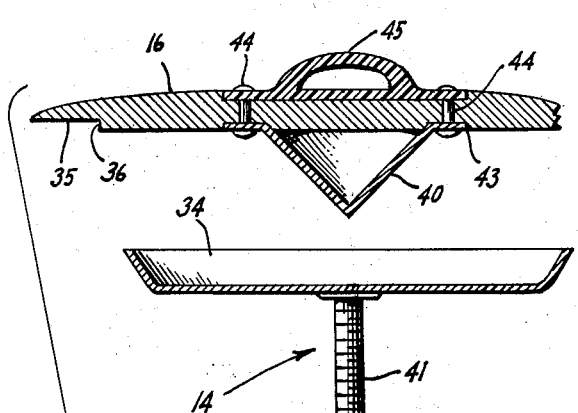
FIG. 3.
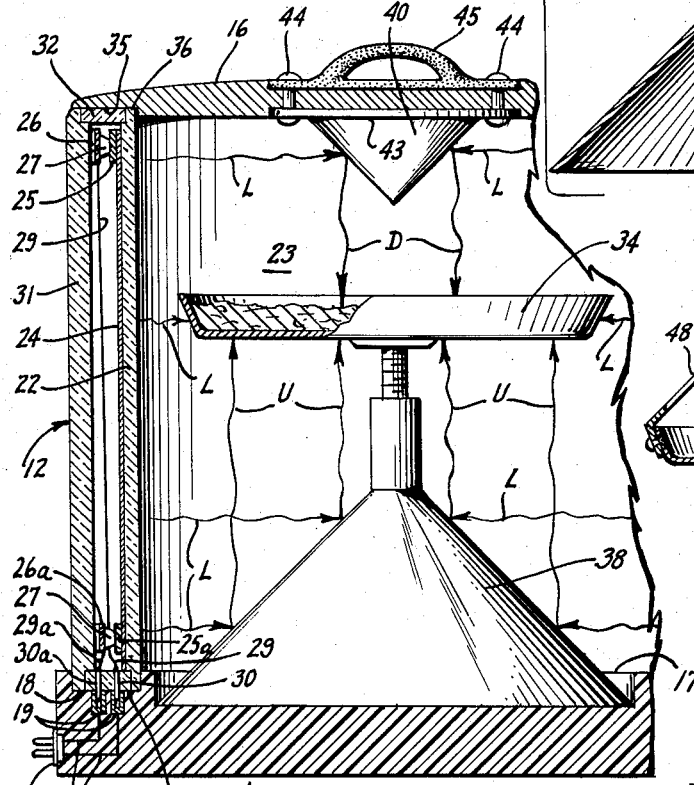
FIG. 2.
FIG. 4.
INVENTOR.
DONALD W. SCOFIELD
BY
ATTORNEY

United States Patent Office 3,103,162
Patented Sept. 10, 1963

3,103,162
ELECTRIC APPLIANCE
Donald W. Scofield, Glenside, Pa., assignor, by mesne assignments, to Philco Corporation, Philadelphia, Pa., a corporation of Delaware
Filed Dec. 20, 1960, Ser. No. 77,119
3 Claims. (Cl. 99—427)

The present invention relates to electric appliances and more particularly to electrically operated apparatus for cooking food. While of broader application, the invention is especially useful in portable domestic cookers of the type disclosed and claimed in the copending application of Edwin P. VanSciver, Serial No. 796,593, filed March 2, 1959, now Patent No. 3,026,400 and assigned to the assignee of the present invention.

In cookers of the kind mentioned above, food is supported within a cooking chamber and is exposed to radiant heat emitted by electrical heat-generating means which surrounds the food and which is incorporated in the enclosure constituting the cooking chamber. This type of cooker, while operating satisfactorily to roast or barbecue foods supported on a spit-like member, has not proven entirely suitable for cooking foods contained in pans, such as pies, cakes, breads and the like.

Accordingly, it is a primary object of this invention to enhance the usefulness of cooking apparatus of the above-noted variety by providing for adequate and satisfactory baking, as well as for roasting foods in such apparatus.

Another object of the invention resides in the provision of novel and improved arrangement whereby proper cooking and browning of food in a cooker of the general kind mentioned above, is assured through uniform and even application of radiant heat to food supported in a roasting or baking pan.

The invention is particularly characterized by the fact that it provides a simplified and inexpensive device which serves as means adapted to support food and as means capable of reflecting heat for direct application to the supported food.

In realization of the above-mentioned general objects and characteristic features, the present invention employs reflective surface means adapted for convenient association with the housing which defines the cooking chamber, said means serving to reflect radiated heat toward the supported food and thereby to improve the uniformity of the baking operation. In practice, the invention utilizes conically shaped bodies of reflective material defining angular wall surfaces which reflect radiated heat toward the supported food. In a more specific aspect of the invention, the food is supported within the cooking chamber in a position intermediate the top and bottom thereof, and radiant heat which is normally projected laterally toward the supported food, is reflected upwardly upon the underside of the food support and downwardly onto the supported food so that the latter is subjected to cooking heat from all sides.

The full nature of the invention and the manner in which the above stated and other objects and features are achieved, will be more fully understood from the following description taken in conjunction with the accompanying drawing, in which:

FIGURE 1 is a perspective view illustrating a preferred embodiment of the invention;

FIGURE 2 is an enlarged fragmentary sectional view taken substantially on line 2—2 of FIGURE 1;

FIGURE 3 is an exploded sectional view of certain associated elements illustrated in FIGURES 1 and 2; and FIGURE 4 is a fragmentary view, on a reduced scale, illustrating a modified form of the invention.

With more particular reference to the drawing, the illustrated cooking apparatus essentially comprises a base 10, an oven-defining structure 12, a food-supporting device 14, and a cover 16.

As clearly shown in FIGURE 2, the base 10 is made of thermally non-conductive material and is provided with a circular depression 17 and with an annular recess 18 arranged concentrically with respect to said depression. Connectors 19 are mounted in the base to open into the recess 18 and are electrically coupled, by means of conductors 20 to a connecting plug 21 carried by the base 10.

As also shown in FIGURE 2, the structure 12 includes a shell or body 22 which is in the form of a tubular member of non-conductive heat-resisting glass. This shell or body 22 provides a cylindrically shaped oven or cooking chamber 23 and has heat-generating means adapted to emit and radiate heat in directions generally perpendicular to the central longitudinal axis of said shell 22 so that food can be roasted in the manner described in the above identified VanSciver disclosure. For that purpose, the heating means employed in the illustrated apparatus can and preferably has the construction disclosed in the said VanSciver disclosure and, as illustrated in FIGURE 2 of the present application, comprises a coating 24 of electrically conductive material applied to the outer circumferential surface of the shell 22. The conductive coating 24 is associated with conductive bands 25 and 25a which form terminals providing for the flow of electric current through said coating. Electrical connection to the coating through the conductive bands 25 and 25a is accomplished by means of circuit components including conductive rings 26 and 26a each having contacts 27, one ring 26 being connected through a conductor 29 with a prong 30 adapted for plugging engagement with one of the connectors 19 in the base 10, the other ring 26a being connected to a second conductor 29a to a second prong 30a adapted for plugging engagement with the other of said connectors 19. As shown, the conductive coating 24 and its described connections and conducting elements are isolated and protected by means of an auxiliary or outer shell 31 arranged concentrically with respect to the main or inner cylindrical shell 22, non-conductive circular elements 32 being arranged about and sealed to the periphery of the concentric shells 22 and 31 so that the space between said shells is hermetically closed. Thus the electrical heating means is hermetically sealed in the space between the concentric shells and, as can be seen in FIGURE 2, the two connecting prongs 30 and 30a pass through one of the sealing elements 32 so that said prongs engage the connectors 19 when the oven-defining structure is in position within the annular recess 18 of the base 10.

The food-supporting device 15 as illustrated in the drawing comprises a pan 34 adapted to receive and contain the food to be cooked. This pan is mounted to support the food within the cooking chamber 23 in a position intermediate the bottom and top thereof, the top of said chamber being closed by means of the cover 16 which has an outwardly extended flange 35 defining a shoulder 36 for centering the cover on the chamber-defining structure 12.

In the arrangement thus far described, it will be understood that the heat generated by the heating means 24 is radiated laterally as represented by the arrows L in FIGURE 2 of the drawing. This lateral radiation of heat is important when barbecuing or roasting food supported on an upright spit-type support coinciding with the central vertical axis of the cooking chamber 23, as described in the VanSciver application aforesaid. However, when foodstuff such as pies and cakes is supported in a pan as illustrated in the drawing, the radiated heat would normally strike the pan only at its side wall and thus would be unsatisfactory for even browning and baking of the food.

In accordance with the present invention there is provided means for so directing the radiated heat as to apply it uniformly to the food so as to effect proper baking and browning thereof. For that purpose, and as shown in the drawing, there is provided a lower reflector 38 whereby the laterally radiated heat is reflected upwardly as represented by the arrows U. Thus heat is applied directly to the underside of the pan 34 and is evenly distributed over the entire bottom area thereof. Also, in accordance with the present invention there is provided a second or upper reflector 40 which, as represented by arrows D, is adapted to direct laterally reflected heat downwardly on to the food contained within the pan 34. The upper reflector is so constructed and arranged that the heat reflected thereby is concentrated over the central area of the food where cooking is usually slower. Thus a more even cooking and browning of the food is assured since heat is applied substantially uniformly over all areas.

In the illustrated embodiment, the reflectors 38 and 40 are each in the form of a cone, the cone constituting the upper reflector 40 being inverted so that its apex confronts the apex of the other cone which constitutes the lower reflector 38, and both cones being disposed to coincide with the central vertical axis of the cooking chamber. The base of the conical lower reflector 38 rests within the depression 17 of the base 10 of the cooker, said depression serving to center said lower reflector within the cooking chamber. Also, in the illustrated embodiment, the conical lower reflector 38 serves to support the pan 34 which for that purpose is provided with a downwardly extending pin 41 in engagement within a hollow sleeve 42 formed with and projecting upwardly from said lower reflector.

In the form illustrated in FIGURES 2 and 3, the upper reflector 40 is carried by the cover 16. For that purpose the base of the reflector 40 has a lateral rim 43 which provides for attachment of said reflector to the cover 16 by means of suitable fasteners such as rivets 44 which also serve to secure handle 45 to the cover.

In the form illustrated in FIGURE 4, the inverted upper conical reflector 40 is suspended above the pan 34 by means of the bracket 46 consisting of struts 48 attached to the pan and terminating with a ring 50 on which the rim 43 of the upper reflector 38 rests, the conical body of said reflector passing through said ring.

The pan 34 may be and preferably is associated with its supporting lower reflector 38 in a manner to be removable therefrom so that the same lower reflector can be used as a support for larger or smaller pans as well as for deeper or shallower pans. For that purpose the interengageable pin 41 and sleeve 42 are threaded so that the pan and sleeve reflector can readily be associated with and disassociated from each other. This threaded interengagement moreover presents the additional advantage of providing for vertical raising or lowering of the pan with respect to its supporting reflector 38 so that the pan can be adjusted to the best cooking position within the chamber 23.

From the foregoing description it will be appreciated that the food supported in the pan is subjected to uniform application of heat. This is due to the fact that the heat generating means surrounds the supported food so as to radiate heat around and upon the supported food, and that a portion of the radiated heat is reflected so as to be applied directly to the bottom of the food-containing pan, as well as onto the food contained therein. It is to be understood that the invention is not limited to the details of the specific preferred embodiment herein shown and described, but embraces such changes and modifications as come within the scope of the appended claims.

What I claim is:

1. A food cooking appliance comprising: a generally cylindrical housing adapted to have its longitudinal axis disposed vertically; means associated with the cylindrical wall of said housing and effective to radiate heat radially inwardly toward said axis; a generally horizontal food supporting platform extending transversely of said axis and located in the housing intermediate the bottom and top end portions thereof; a first cone type heat reflector disposed within the housing with its base located adjacent the bottom end portion of said housing and with its apex directed upwardly toward the under side of said platform; a second cone type heat reflector disposed within the housing with its base located adjacent the top end portion of said housing and with its apex directed downwardly toward the upper side of said platform; and a post extending upwardly from the apex of the first cone type reflector, the upper end of said post supporting the platform at a central region thereof so that all but said central region is directly exposed to heat reflected from said first cone type reflector, said second cone type reflector being smaller than said first cone type reflector and having its axis generally coincident with the axis of said first cone type reflector so that heat reflected from said second cone type heat reflector is concentrated over said central region.

2. A food cooking appliance as set forth in claim 1, in which the generally cylindrical housing has a top access opening and a removable cover therefor, the second cone type heat reflector having its base attached to the cover surface which is adapted to face the interior of said housing.

3. A cooking appliance as set forth in claim 1, in which the food supporting platform has a bracket structure including a portion disposed in general parallelism to the mentioned upper side of the food supporting platform, the second cone type heat reflector having its base arranged in engagement with the aforesaid portion of the bracket structure.

References Cited in the file of this patent
UNITED STATES PATENTS

| | | |
|---|---|---|
| 264,627 | Clifford | Sept. 18, 1882 |
| 593,098 | Holland | Nov. 2, 1897 |
| 1,963,883 | Brinkmier | June 19, 1934 |
| 2,187,888 | Nachumson | Jan. 23, 1940 |
| 2,227,608 | Tinnerman | Jan. 7, 1941 |
| 2,314,249 | Sherman | Mar. 6, 1943 |